(12) United States Patent
Woo et al.

(10) Patent No.: US 9,473,711 B2
(45) Date of Patent: Oct. 18, 2016

(54) IMAGE PROCESSING APPARATUS AND IMAGE PROCESSING METHOD FOR THE SAME

(71) Applicant: LG INNOTEK CO., LTD., Seoul (KR)

(72) Inventors: Jeong Woo Woo, Seoul (KR); Ji Ha Lee, Seouk (KR)

(73) Assignee: LG Innotek Co., Ltd., Seoul (KR)

( * ) Notice: Subject to any disclaimer, the term of this patent is extended or adjusted under 35 U.S.C. 154(b) by 594 days.

(21) Appl. No.: 13/836,044

(22) Filed: Mar. 15, 2013

(65) Prior Publication Data
US 2013/0286214 A1    Oct. 31, 2013

(30) Foreign Application Priority Data
Apr. 26, 2012 (KR) .................. 10-2012-0044107

(51) Int. Cl.
  *H04N 5/00* (2011.01)
  *H04N 5/33* (2006.01)
  *H04N 5/225* (2006.01)
  *H04N 5/235* (2006.01)

(52) U.S. Cl.
  CPC ............ *H04N 5/33* (2013.01); *H04N 5/2253* (2013.01); *H04N 5/2256* (2013.01); *H04N 5/2354* (2013.01)

(58) Field of Classification Search
  CPC .......... H04N 5/33; H04N 3/09; H04N 5/332; H04N 5/2354; H04N 9/09; H04N 5/353; H04N 2209/048; H04N 7/18; G01J 5/02; G01J 2005/0077; G09G 5/00; G06F 3/0308; H05B 37/02; G06K 9/00; G06K 9/00288
  See application file for complete search history.

(56) References Cited

U.S. PATENT DOCUMENTS

| | | | |
|---|---|---|---|
| 4,074,294 A * | 2/1978 | Fujita et al. | 396/317 |
| 4,194,818 A * | 3/1980 | Matteson et al. | 396/159 |
| 2002/0067341 A1* | 6/2002 | Kobayashi | 345/157 |
| 2009/0059046 A1* | 3/2009 | Hasegawa | 348/296 |
| 2013/0155249 A1* | 6/2013 | Neeley et al. | 348/159 |
| 2013/0208953 A1* | 8/2013 | Yuan | 382/118 |
| 2013/0230294 A1* | 9/2013 | Sassa et al. | 386/224 |

FOREIGN PATENT DOCUMENTS

| | | |
|---|---|---|
| JP | 2010-220043 A | 9/2010 |
| KR | 10-2009-0117586 A | 11/2009 |
| KR | 10-1132407 B1 | 3/2012 |

* cited by examiner

*Primary Examiner* — Jay Patel
*Assistant Examiner* — Frank Huang
(74) *Attorney, Agent, or Firm* — Birch, Stewart, Kolasch & Birch, LLP

(57) ABSTRACT

A infrared camera includes: a camera module photographing a subject; a lighting module outputting light to the subject; a control module controlling the camera module to photograph the subject and outputting a lighting driving signal synchronized with an operation of the camera module; and a lighting driving module driving the lighting module based on the lighting driving signal output from the control module.

8 Claims, 3 Drawing Sheets

IMAGE PROCESSING APPARATUS AND IMAGE PROCESSING METHOD FOR THE SAME

CROSS-REFERENCE TO RELATED APPLICATIONS

The present application claims priority under 35 U.S.C. 119 and 35 U.S.C. 365 to Korean Patent Application No. 10-2012-0044107 (filed on 26 Apr. 2012), which is hereby incorporated by reference in its entirety.

BACKGROUND

In general, closed circuit televisions (CCTVs) installed in the indoors or the outdoors of departments, banks, exhibition centers, and factories as well as typical houses have been variously used in order to perform antitheft functions and determine the operating state of machine, the process flow, or the overall situation.

The CCTVs have been installed in a specific place to monitor all situations, which are happened in the place, at a remote plate. To this end, the CCTVs include image transmitters and display units to receive signals transmitted from the image transmitters and supply the signals to display apparatuses.

Since a monitoring function of the CCTV is lowered at night having no light or at a dark place where a user cannot confirm an object because there is no light or only weak light, a lighting unit is separately installed at the CCTV. For example, an infrared camera can be installed in the CCTV.

The infrared camera has an advantage that it may perform an optimal monitoring function even at a dark place.

FIG. 1 is a block diagram illustrating an infrared camera according to the related art.

Referring to FIG. 1, the infrared camera includes a camera module 10, a lighting module 20, a camera driving module 30, a lighting driving module 40, and a control module 50.

The camera module 10 photographs a subject and includes a lens unit 12 and a charge coupled device (CCD) sensor 14.

The lens unit 12 photographs the subject, and at least one lens may be mounted in the lens unit 12. For example, a plurality of lenses is mounted in the lens unit 12 so that the lens unit 12 may perform zoom-in/zoom-out operation.

The CCD sensor 14 detects the image of the subject passing through the lens unit 12. The detected image may be transmitted to a user at a remote place.

The CCD sensor 14 accumulates the quantity of light input through the lens unit 12, and outputs the image taken by the lens unit 12 according to the accumulated quantity of the light in response to a vertical synchronization signal.

The lighting module 20 emits light to the subject.

The lighting module 20 includes an infrared irradiating unit 22. The infrared irradiating unit 22 may be implemented as a single irradiating unit or a plurality of infrared irradiating units.

The camera driving module 30 drives the camera module 10. In detail, the camera driving module 30 drives the lens unit 12. For example, the camera driving module 30 may change a location of a lens constituting the lens unit 12 according to a zoom ratio.

The lighting driving module 40 drives the infrared irradiating unit 22.

The control module 50 controls the camera module 10 and the lighting module 20.

The control module 50 controls a location of the lens unit 12 of the camera module 10 so that the lens unit 12 may perform a zoom operation.

The control module 50 controls an operation of the lighting module 20.

The control module 50 may include a photo sensor which detects light according to an operation of a photoelectric cell serving as a device in which resistance is changed when light is irradiated to the device. The control module 50 control brightness and a flicker frequency of the lighting module 20 according to an output voltage corresponding to an amount of light input through the photo sensor.

In the foregoing infrared camera, the lighting module 20 is driven by a continuous lighting scheme, and thus emits light to the subject.

FIG. 2 is a timing chart illustrating an operation of the lighting module 20 according to the related art.

As shown in FIG. 2, the lighting module 20 continuously emits light to the subject in a continuous lighting scheme regardless of an operation of the camera module 10.

However, according to the above continuous lighting scheme, the light is generated even if the sensor does not acquire an image, so that heat is continuously generated and power consumption is increased.

SUMMARY

The embodiment provides an infrared camera capable of operating a light module in synchronization with a camera module and a method of operating the same.

The embodiment provides an infrared camera generating a driving signal for intermittently driving a lighting module and a method of operating the same.

The embodiment can solve the problems of heat generation and power consumption caused as the light module is driven in a continuous lighting scheme.

Objects of the embodiment may not be limited to the above and other objects and other objects which are not described may be clearly comprehended to those of skill in the art to which the embodiment pertains through the following description According to the embodiment, there is provided an infrared camera including: a camera module photographing a subject; a lighting module outputting light to the subject; a control module controlling the camera module to photograph the subject and outputting a lighting driving signal synchronized with an operation of the camera module; and a lighting driving module driving the lighting module based on the lighting driving signal output from the control module.

According to the embodiment, there is provided method of operating an infrared camera using a lighting device, the method including: photographing a subject; acquiring an image by detecting the photographed subject; and generating light by the lighting device for an acquisition time of the image.

According to the embodiment, since the lighting module is intermittently operated in synchronization with the camera module instead of a continuous lighting scheme, a heat generation problem due to continuous lighting of the lighting module can be solved and power consumption can be reduced.

DETAILED DESCRIPTION OF THE EMBODIMENTS

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further, it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

Accordingly, for example, it should be understood that a block diagram of the specification illustrates a conceptual point of view of an illustrative circuit that realizes principles of the embodiment. In the same manner, it should be understood that all flowcharts, state transition diagrams, and pseudo codes may be actually represented in a computer readable medium and may represent various processes to be executed by a computer or a processor regardless of whether the computer or the processor is clearly shown.

Functions of various devices shown in drawings including a processor or a function block expressed as a concept similar to the processor may be provided by using hardware capable of executing suitable software as well as dedicated hardware. When the functions are provided by the processor, the functions may be provided by a single dedicated processor, a single shared processor, or a plurality of individual processors and a part of the functions may be shared.

It should be understood that use of a processor, a control or the term presented as a similar concept to the processor and the control shall not be interpreted as exclusively referring to hardware capable of executing software but shall be understood that it implicitly includes a digital signal processor (DSP), ROM, RAM, and non-volatile memory storing hardware and software. Other hardware generally known in the art may be included.

Figure 1:
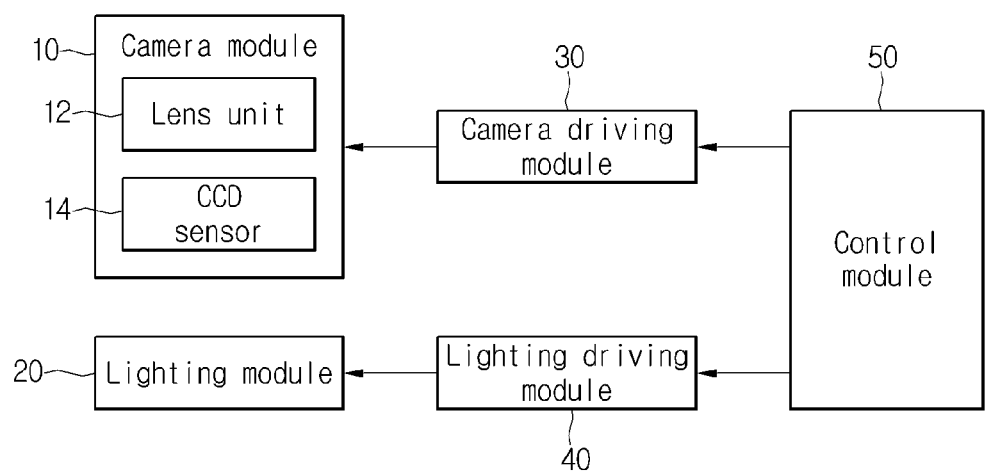
FIG. 1 is a block diagram illustrating an infrared camera according to the related art.
Figure 2:
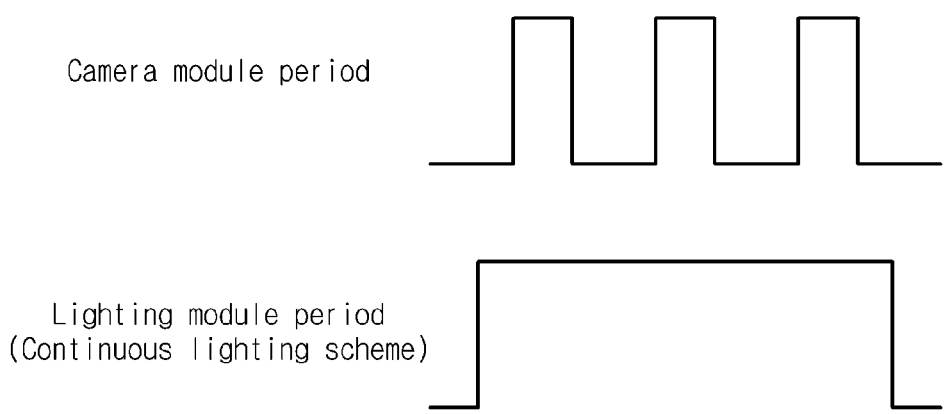
FIG. 2 is a timing chart illustrating an operation of the lighting module according to the related art.
Figure 3:
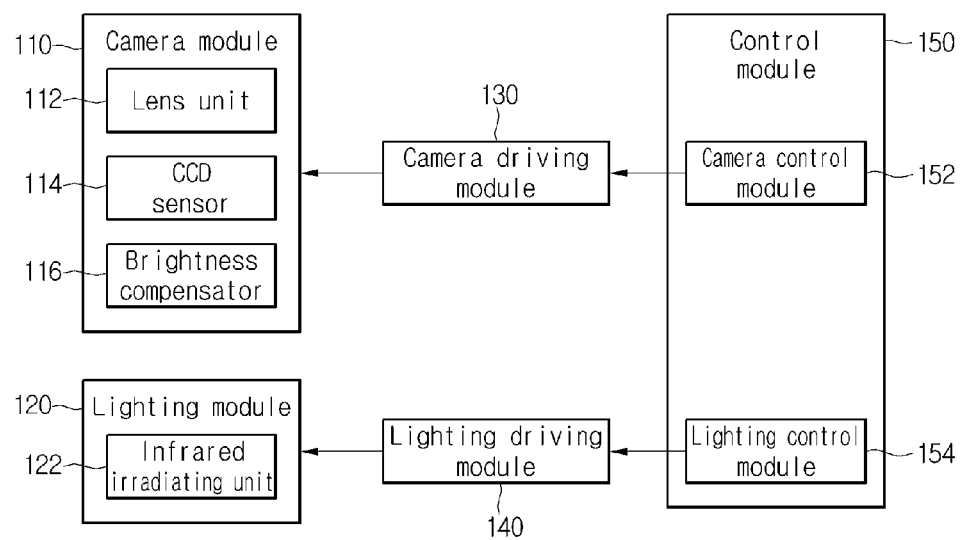
FIG. 3 is a block diagram illustrating a configuration of an infrared camera according to the embodiment.

FIG. 3 is a block diagram illustrating a configuration of an infrared camera according to the embodiment.

Referring to FIG. 3, the infrared camera includes a camera module 110, a lighting module 120, a camera driving module 130, a lighting driving module 140, and a control module 150.

The camera module 110 includes a lens unit 112, a CCD sensor 114, and a brightness compensator 116.

The lighting module 120 includes an infrared irradiating unit 122.

The control module 150 includes a camera control module 152 and a lighting control module 154.

Modules included in the foregoing infrared camera may be protected by an external case. The case may a pipe shape or a dome shape. The case performs a technique protecting a wire necessary for driving the modules included in the infrared camera.

Accordingly, the case may include a material having a waterproof function and a moisture-proof function. The infrared camera includes a separate hood and may protect the modules from external pollution materials such as rain or snow.

The camera module 110 photographs the subject.

The camera module 110 includes the lens unit 112, the CCD sensor 114, and the brightness compensator 116.

The lens unit 112 photographs the subject, and at least one lens may be mounted in the lens unit 112. For example, a plurality of lenses is mounted in the lens unit 112 so that the lens unit 112 may perform the zoom-in/zoom-out operation.

That is, the lens unit 112 serves as an optical system (OPS), and may include a filter. The lens unit 112 optically processes the light of a photographed image.

The CCD sensor 114 detects the image of the subject passing through the lens unit 112. The detected image may be transmitted to a user at a remote place.

The CCD sensor 114 accumulates the quantity of light input through the lens unit 112 during a preset exposure period, and outputs the image taken by the lens unit 112 according to the accumulated quantity of the light in response to a vertical synchronization signal.

The image is acquired by the CCD sensor 114 to convert the light reflected from the subject into the electrical signal.

That is, the CCD sensor 114 acquires the image by converting the light reflected from the subject during an exposure period which is outputted through the control module 150 into an electric signal to be described below.

In order to acquire a color image by using the CCD sensor 114, color filters are required, and a filter (not shown), which is called a color filter array (CFA), has been employed. The CFA passes only a light representing one color for each pixel, and has a regularly-arrayed structure. The CFA may have various forms according to the array structure.

The brightness compensator 116 processes an analog signal output from the CCD sensor 114 to remove a high frequency noise, adjusts amplitude of the processed analog signal, and converts the adjusted analog signal into a digital signal.

The brightness compensator 116 compensates for the converted digital image signal. Particularly, the brightness compensator 116 performs location based brightness compensation with respect to the image signal and further performs pixel based brightness compensation with respect to the image signal in which the location based brightness is performed.

To this end, the brightness compensator 116 includes a lens shading compensator (not shown) and a gamma compensator (not shown).

The lens shading compensator is a block to compensate for a lens shading phenomenon indicating that the amount of light at the center of the image is different from the amount of light at an edge region of the image. The lens shading compensator receives a lens shading setting value from a camera control module 152 to be described below and compensates for colors of the center and the edge region of the image.

The lens shading compensator may receive a shading variable set differently according to a type of lighting device constituting the lighting module 120, and process lens shading of the image suited to the received shading variable. Accordingly, the lens shading compensator may process the lens shading by differently applying a shading degree according to the type of the lighting device.

Meanwhile, to prevent a saturation phenomenon occurring in the image, the lens shading compensator may receive a shading variable set differently according to an automatic exposure weight applied to a specific region of the image, and process lens shading of the image suited to the received shading variable.

In general, gamma is a factor to indicate a contrast state, and refers to an inclination of a characteristic curve, that is, variation of density/variation of an exposure amount. A relationship of an electron beam current with respect to an input voltage of an image signal is non-linear and brightness of an image with respect to beam current is linear in a display device such as a CRT. That is, the brightness of the image with respect to the input voltage of the image signal is non-linear.

Accordingly, the gamma compensator performs gamma compensation with respect to the image signal so that the image signal may have linearity in consideration of the non-linearity.

In detail, the lens shading compensator brightness variation occurring at an edge region of the image signal as an automatic exposure weight is applied to a central region of the image signal.

That is, when the image signal is saturated due to lighting, intensity of light is gradually lowered from the center to an outer portion in the form of a concentric circle, so that the lens shading compensator amplifies an edge signal of the image signal to compensate for the brightness at the edge region relative to the center of the image signal.

When the location based brightness compensation is performed by the lens shading compensator, the gamma compensator performs pixel based brightness compensation.

The lighting module 120 emits light to the subject.

The lighting module 120 includes an infrared irradiating unit 122. The infrared irradiating unit 122 may be implemented as a single irradiating unit or a plurality of infrared irradiating units.

The lighting module 120 is operated in synchronization with an operation of the camera module 110.

In detail, the lighting module 120 is operated in synchronization with an exposure period of the CCD sensor 114 included in the camera module 110.

That is, the lighting module 120 operates while the image is acquired by the CCD sensor 114 and emits light to the subject.

The camera driving module 130 drives the camera module 110. In detail, the camera driving module 130 drives the lens unit 112. For example, the camera driving module 30 may change a location of a lens constituting the lens unit 112 according to a zoom ratio. The camera driving module 130 may use an AC motor and a DC motor. The camera driving module 130 receives a control signal from a control module 150 to be described below.

The lighting driving module 140 drivers the infrared irradiating unit 122.

The lighting driving module 140 controls driving of the infrared irradiating unit 122 according to a lighting driving signal supplied through the control module 150 to be described below.

The control module 150 controls the camera module 110 and the lighting module 120. To this end, the control module 150 includes a camera control module 152 and a lighting control module 154.

The camera control module 152 controls a location of the lens unit 112 of the camera module 110 so that the lens unit 112 may perform a zoom operation.

To this end, the camera control module 152 generates a control signal necessary for the zoom operation and provides the control signal to the camera driving module 130 so that the subject is photographed at various view angles from a wide angle photographing mode to a telephoto shot mode. The control signal necessary for the zoom operation may be automatically generated depending on an input signal of the user at a remote place or the size of a photographed subject.

The camera control module 152 determines an exposure time and controls the CCD sensor 114 to acquire the image during an exposure period corresponding to the determined exposure time.

The lighting control module 154 controls an operation of the lighting module 120.

The control module 154 may include a photo sensor which detects light according to an operation of a photoelectric cell serving as a device in which resistance is changed when light is irradiated to the device. The control module 154 control brightness and a flicker frequency of the lighting module 122 according to an output voltage corresponding to an amount of light input through the photo sensor.

The lighting control module 154 controls an operation of the lighting module 120 in synchronization with the camera module 110 which is controlled by the camera control module 152.

That is, the lighting control module 154 receives information about an exposure time from the camera control module 152 when the image is acquired through the CCD sensor 114, and accordingly controls an operation of the lighting module 120 based on the received exposure time.

That is, the lighting control module 154 generates and outputs a lighting driving signal for driving the lighting module 120 using the information about the exposure time for only the acquisition time of the image by the CCD sensor 114.

If the lighting driving signal is outputted through the lighting control module 154, the lighting driving module 140 operates the lighting module 120 using the output lighting driving signal.

In this case, if the lighting module 120 is operated exactly in synchronization with the exposure time of the CCD sensor 114, the normal image acquisition may not be achieved.

For example, if the lighting module is driven exactly in synchronization with an acquisition time of the image through the CCD sensor 114, the normal image acquisition may not be achieved for a predetermined time corresponding to a response time of the lighting module 120.

Accordingly, the lighting control module 154 compensates for the generated lighting driving signal in consideration of the response time of the lighting module 120.

That is, the lighting module 120 confirms a time from driving start to a stabilized time, and accordingly the lighting module 120 is firstly driven based on the confirmed time.

This is because exposure of the CCD sensor 114 starts from the stabilized time of the lighting module 120. Accordingly, the image acquisition is stably achieved by the CCD sensor 114.

Accordingly, an exposure width according to an exposure time of the CCD sensor 114 is narrower than a lighting width according to a lighting time of the lighting module 120. This means that the exposure time of the CCD sensor 114 is shorter than the lighting time of the lighting module 120.

The lighting module 120 operates before a predetermined time from the start of the exposure of the CCD sensor 114. The lighting module 120 stops when a predetermined time has elapsed after the stop of the exposure of the CCD sensor 114.

According to the embodiment, since the lighting module is intermittently operated in synchronization with the camera module instead of a continuous light scheme, generation of the heat caused by continuous lighting of the lighting module can be prevented and power consumption can be reduced.

Figure 4:
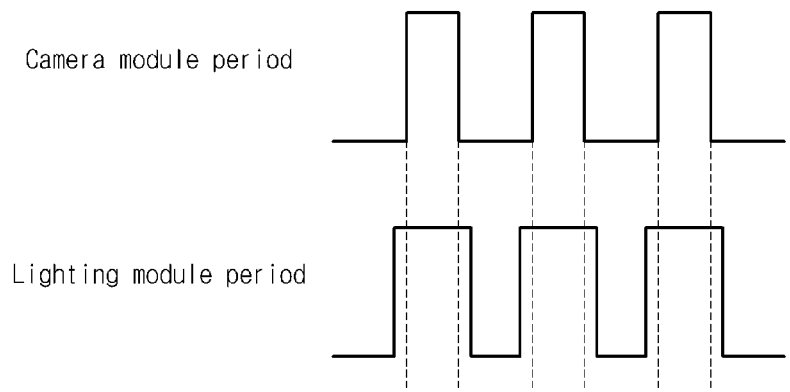
FIG. 4 is a timing chart illustrating a method of driving a lighting module according to the embodiment.

FIG. 4 is a timing chart illustrating a method of driving a lighting module according to the embodiment.

Referring to FIG. 4, the camera module 110, in detail, the CCD sensor operates during a time period corresponding to a preset exposure time to acquire an image.

In this case, the lighting module 120 is intermittently operated in synchronization with an operation of the camera module 110.

That is, the lighting module 120 does not emit continuous light in a continuous lighting scheme but is intermittently operated in synchronization with the operation of the camera module 110.

That is, the lighting module 120 starts an operation before a predetermined time from the acquisition time point of the image according to the exposure time of the CCD sensor 114. Accordingly, the lighting module 120 stops the operation after a predetermined time has elapsed from a stop time point of the image acquisition according to the exposure time.

Figure 5:
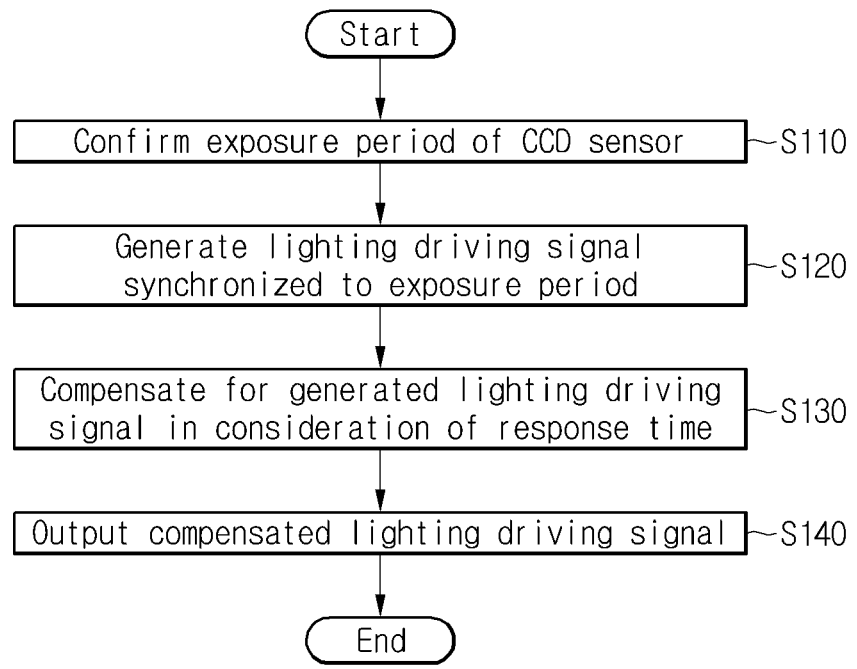
FIG. 5 is a flowchart illustrating a method of operating an infrared camera according to the embodiment according to steps.

FIG. 5 is a flowchart illustrating a method of operating an infrared camera according to the embodiment according to steps.

Referring to FIG. 5, the lighting control module 154 confirms an operation state of the camera module 110 controlled by the camera control module 152. That is, the lighting control module 154 confirms an exposure period of the CCD sensor 114 (S110).

If the exposure period of the CCD sensor 114 is confirmed, the lighting control module 154 generates a lighting driving signal in synchronization with the exposure period according to the confirmed exposure period (S120).

That is, the lighting control module 154 generates a lighting driving signal including a signal for driving a lighting device at a start time of exposure and a signal for stopping driving of the lighting device at a stop time of the exposure.

In this case, the generated lighting driving signal may be the same as the exposure time of the CCD sensor 114.

Next, the lighting control module 154 compensates for the generated lighting driving signal in consideration of a response time (S130).

That is, the lighting module 120 has the response time defined in the specification and may stably operate after the response time has elapsed from the start time point of driving.

Accordingly, the lighting control module 154 controls the camera module 110 to operate when the lighting module 120 is stabilized by using the response time.

The operation of the camera module 110 may be implemented by increasing a lighting time of the lighting module 120 according to the generated driving signal using the response time.

After that, if the lighting driving signal is compensated, the lighting control module 154 outputs the compensated lighting driving signal (S140).

According to the embodiment, since the lighting module is intermittently operated in synchronization with the camera module instead of a continuous lighting scheme, a heat generation problem due to continuous lighting of the lighting module can be solved and power consumption can be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An infrared camera comprising:
a camera module photographing a subject during an exposure period;
a lighting module outputting light to the subject;
a control module controlling the camera module to photograph the subject and outputting a lighting driving signal synchronized with an operation of the camera module; and
a lighting driving module driving the lighting module based on the lighting driving signal output from the control module,
wherein the control module is configured to
generate the lighting driving signal for lighting module using an exposure time for only the image acquisition time of the camera module,
confirm a response time of the lighting module from driving state to a stabilized time, and
compensate the lighting driving signal in consideration of the response time of the lighting module,
wherein the compensated lighting driving signal is for starting an operation of the lighting module before the response time from a start time point of the image acquisition time of the camera module, and
wherein the exposure of the camera module starts from the stabilized time of the lighting module.

2. The infrared camera of claim 1, wherein the camera module comprises:
   a lens photographing the subject; and
   a CCD sensor detecting an image of the subject photographed by the lens to acquire the image.

3. The infrared camera of claim 2, wherein the CCD sensor acquires the image for the exposure time output through the control module, and
   wherein the exposure time is the image acquisition time.

4. The infrared camera of claim 3, wherein the compensated lighting driving signal is for stopping the operation of the lighting module after a predetermined time has elapsed from a finish time point of the image acquisition time of the CCD sensor.

5. The infrared camera of claim 3, wherein the image acquisition time of the image by the CCD sensor according to the exposure time is shorter than a lighting time of the lighting module according to the compensated lighting driving signal.

6. A method of operating an infrared camera using a lighting device, the method comprising:
   photographing, by a camera module, a subject during an image acquisition time;
   acquiring, by the camera module, an image by detecting the photographed subject; and
   generating, by a light module, light for the image acquisition time of the camera module,
   wherein the generating of the light comprises:
      generating the lighting driving signal for driving the lighting module using an exposure time for only the image acquisition time of the camera module,
      confirming a response time of the lighting module from driving state to a stabilized time, and
      compensating the lighting driving signal in consideration of the response time of the lighting module,
   wherein the compensated lighting driving signal is for starting an operation of the lighting module before the response time from a start time point of the image acquisition time of the camera module; and
   wherein the exposure of the camera module starts from the stabilized time of the lighting module.

7. The method of claim 6, wherein each of the image acquisition times comprises a first time point as the start time point and a second time point,
   wherein the acquiring of the image comprises:
      starting the acquiring of the image at the first time point; and
      stopping the acquiring of the image at the second time point.

8. The method of claim 7, wherein the generating of the light further comprises:
   stopping the generation of the light after a predetermined time has elapsed from the second time point.

* * * * *